(12) United States Patent
Ito et al.

(10) Patent No.: US 6,992,431 B2
(45) Date of Patent: Jan. 31, 2006

(54) DISPERSION FOR PREVENTING ELECTRIFICATION ANTISTATIC FILM AND IMAGE DISPLAY DEVICE

(75) Inventors: Takeo Ito, Saitama (JP); Tsuyoshi Oyaizu, Saitama (JP); Akira Mikami, Saitama (JP); Hitoshi Tabata, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 22 days.

(21) Appl. No.: 10/363,267

(22) PCT Filed: Sep. 11, 2001

(86) PCT No.: PCT/JP01/07863

§ 371 (c)(1),
(2), (4) Date: Mar. 10, 2003

(87) PCT Pub. No.: WO02/22757

PCT Pub. Date: Mar. 21, 2002

(65) Prior Publication Data

US 2004/0058148 A1    Mar. 25, 2004

(30) Foreign Application Priority Data

Sep. 11, 2000    (JP)    ............................. 2000-275197

(51) Int. Cl.
*H01J 29/89*    (2006.01)

(52) U.S. Cl. ..................... 313/478; 313/439; 313/493; 313/495; 313/498; 313/422; 313/512; 313/479; 313/480; 428/328; 428/331; 428/405; 428/689; 428/697; 428/698; 428/699; 428/701; 428/702

(58) Field of Classification Search ................ 428/328, 428/331, 405, 689, 697–702; 313/478, 479–480, 313/439, 493, 495, 498, 422, 512; 106/286.4, 106/286.5, 286.2, 287.19, 287.34, 436, 438, 106/441–442, 450, 455, 481, 286.8, 287.17
See application file for complete search history.

(56) References Cited

U.S. PATENT DOCUMENTS

| | | | |
|---|---|---|---|
| 4,101,803 A | * | 7/1978 | Retsky et al. .................. 315/3 |
| 5,189,337 A | | 2/1993 | Endo et al. |
| 5,785,892 A | | 7/1998 | Nishida et al. |

FOREIGN PATENT DOCUMENTS

| | | |
|---|---|---|
| EP | 301104 | 2/1989 |
| JP | 8-114803 | 5/1996 |

\* cited by examiner

*Primary Examiner*—Ling X. Xu
(74) *Attorney, Agent, or Firm*—Oblon, Spivak, McClelland, Maier & Neustadt, P.C.

(57) ABSTRACT

An image display device having a vacuum envelope which has a light transmissible panel, a funnel and a neck, its inside held vacuum, a phosphor layer is formed on the inside surface of the light transmissible panel, an electron gun is disposed within the neck. An antistatic film which contains high-resistance fine particles having a specific resistivity of $10^6$ to $10^9$ Ω·cm is formed on inside wall of the neck. The image display device is free from deterioration of display characteristics caused by a change of the track of electrons emitted by the application of voltage, a spark in a tube, or a leakage current.

11 Claims, 2 Drawing Sheets

DISPERSION FOR PREVENTING ELECTRIFICATION ANTISTATIC FILM AND IMAGE DISPLAY DEVICE

TECHNICAL FIELD

The present invention relates to a dispersion for preventing electrification, an antistatic film, and an image display device such as a color cathode-ray tube, a field emission display (FED), or the like having the antistatic film.

BACKGROUND ART

According to an existing color cathode-ray tube (CRT), electrons emitted from an electron gun partly collide against the inside wall of a neck or ions ionized by the emitted electrons adhere to it, and electrification is caused. Therefore, an antistatic film is formed on a glass substrate of the inside wall of the neck in order to prevent the track of the emitted electrons from being deflected by the electrification and their arrival to a proper position on a phosphor layer from being disturbed.

As a material for forming of such an antistatic film, there have been used fine particles comprised of a semiconducting substance having a specific resistivity of $10^5$ $\Omega$·cm or more, such as an ITO (Indium-Tin-Oxide), an ATO (Antimony-Tin-Oxide) or $ZnO_2$.

There is also a generally known method of adding a surface active agent or quaternary amine to $SiO_2$ or applying it to an $SiO_2$ film so to form a film having ion conductivity.

However, any of the films was not satisfactory enough as an antistatic film to be disposed on an insulating member arranged in a vacuum envelope, such as the inside wall of the neck of a color cathode-ray tube.

Specifically, the antistatic film including fine particles comprised of the semiconducting substance such as an ITO or an ATO has a high dependency of a resistance value (surface resistivity) on the thickness of the film, and it was necessary to control quite accurately the thickness of the film in order to control the surface resistivity in the most desirable range of $10^{10}$ to $10^{12}$ $\Omega/cm^2$. And, because methods such as spray coating and brushing are hard to accurately control the thickness of the antistatic film, these methods could not be used, and a dip coating method or a spin coating method involving a high production cost was used to form the antistatic film. Even when the dipping method or the spin coating method is used, it was necessary to strictly control the thickness of a film, and there were disadvantages that the control of the film thickness was troublesome and the production cost was high.

Since an existing film having ion conductivity has a reduced dependency of a resistance value on the thickness of a film but a large dependency on environments, such as a temperature and a humidity, and poor reliability, it could not be used as an antistatic film for the interior of a vacuum tube or the like in particular.

The present invention was achieved in order to remedy the above problems, and it is an object of the invention to provide an antistatic film having stable antistatic properties because it has a reduced dependency of a resistance value on the thickness of the film and a reduced dependency on environments such as a temperature and a humidity, a dispersion which allows to form such an antistatic film by a simple and easy applying method, and an image display device having the antistatic film.

DISCLOSURE OF THE INVENTION

A first aspect of the present invention is a dispersion for preventing electrification, comprising high-resistance fine particles having a specific resistivity of $10^6$ to $10^9$ $\Omega$·cm as a primary component, as described in claim 1.

This dispersion for preventing electrification can be used to form an antistatic film having a reduced dependency of a resistance value (surface resistivity) on the film thickness and on environments and having a stable antistatic property by a simple and easy method.

When the high-resistance fine particle in the dispersion have a specific resistivity of less than $10^6$ $\Omega$·cm, the resistance value of the antistatic film obtained from the dispersion highly depends on the film thickness, and an antistatic film having a desired stable resistance value cannot be obtained by a low-cost simple and easy method such as spray coating or brushing. When fine particle having a specific resistivity of exceeding $10^9$ $\Omega$·cm are used, a film having adequate antistatic property cannot be obtained.

As described in one embodiment, the high-resistance fine particle in the dispersion for preventing electrification according to the present invention can be composed of antimony pentoxide ($Sb_2O_5$) having a pyrochlore crystal structure. A pyrochlore crystal has a cubic (isometric) system and high crystal symmetry, so that the movement of carrier electrons is not largely influenced by crystal orientation in a polycrystalline state. And, the high-resistance fine particle having a specific resistivity of $10^6$ to $10^9$ $\Omega$·cm can be obtained easily because a crystal grain boundary has a low electric resistance.

As described in another embodiment, the high-resistance fine particle can include a core layer which is composed of at least one semiconducting substance selected from $SnO_2$, $In_2O_3$, $Sb_2O_5$ and $ZnO_2$ and a covering layer which is formed on the core layer and composed of at least one insulating substance selected from $SiO_2$, $TiO_2$, $Al_2O_3$ and $ZrO_2$. The fine particle having the above structure can easily realize a specific resistivity of $10^6$ to $10^9$ $\Omega$·cm.

Besides, as described in another embodiment, the high-resistance fine particle can have a particle diameter of 5 to 100 nm.

A second aspect of the present invention is an antistatic film, which is formed on the surface of an insulating substrate held in a vacuum, comprising mainly high-resistance fine particles having a specific resistivity of $10^6$ to $10^9$ $\Omega$·cm, as described in another embodiment.

The high-resistance fine particle can be composed of antimony pentoxide ($Sb_2O_5$) having a pyrochlore crystal structure, as described in another embodiment. In addition, as described in another embodiment, the high-resistance fine particle can include a core layer which is composed of at least one semiconducting substance selected from $SnO_2$, $In_2O_3$, $Sb_2O_5$ and $ZnO_2$ and a covering layer which is formed on the core layer and composed of at least one insulating substance selected from $SiO_2$, $TiO_2$, $Al_2O_3$ and $ZrO_2$. Besides, as described in claim 8, the high-resistance fine particle can have a particle diameter of 5 to 100 nm.

The antistatic film of the present invention has a reduced dependency of the surface resistivity on the film thickness, so that it is not necessary to precisely control the film thickness. Thus, it can be formed by a simple and easy method such as spray coating or brushing.

A relationship between the film thickness and the resistance value (surface resistivity) of the antistatic film of the present invention and a conventional antistatic film comprised of fine particles of an ITO or an ATO is schematically shown in FIG. 1. The antistatic film of the present invention has a reduced dependency of the resistance value on the film thickness as compared with the conventional antistatic film and has an increased width (range) of the film thickness enabling to obtain a desired resistance value.

And, the antistatic film of the present invention has a stable resistance value and a reduced dependency of the resistance value on environments, so that it can be used in a vacuum atmosphere such as in a vacuum tube. Specifically, it can be used as the antistatic film formed on the inside wall of the neck of a color cathode-ray tube and can also be used extensively as an antistatic film for parts in the vacuum tube to which a high voltage is applied, for example an antistatic film formed on an insulating member such as a spacer of a field emission display (FED).

A third aspect of the present invention is an image display device, comprising a vacuum envelope which has a light transmissible panel and its inside held vacuum, a phosphor layer which is formed on the inside surface of the light transmissible panel, an electron emission means and an insulating member which are disposed within the vacuum envelope, wherein the insulating member has the antistatic film as set forth in claim 5 on the surface thereof, as described in claim 9.

The image display device of the present invention can have an antistatic film with a thickness of 50 to 1000 nm as described in claim 10. And, as described in claim 11, the antistatic film can be formed to cover 20% or more of the surface area of the insulating member.

The image display device of the present invention has the antistatic film, which has a reduced dependency of a resistance value on the film thickness and environment conditions and a desired stable resistance value, formed on the surface of the insulating member which is disposed in the vacuum envelope, so that the display characteristics are not deteriorated by a change of the track of electrons emitted by the application of voltage, a spark in the tube, or a leakage current, and good display characteristics are exhibited.

BEST MODE FOR CARRYING OUT THE INVENTION

Preferred embodiments of the present invention will be explained. It shall be noted that the present invention is not limited to the following embodiments.

Figure 1:
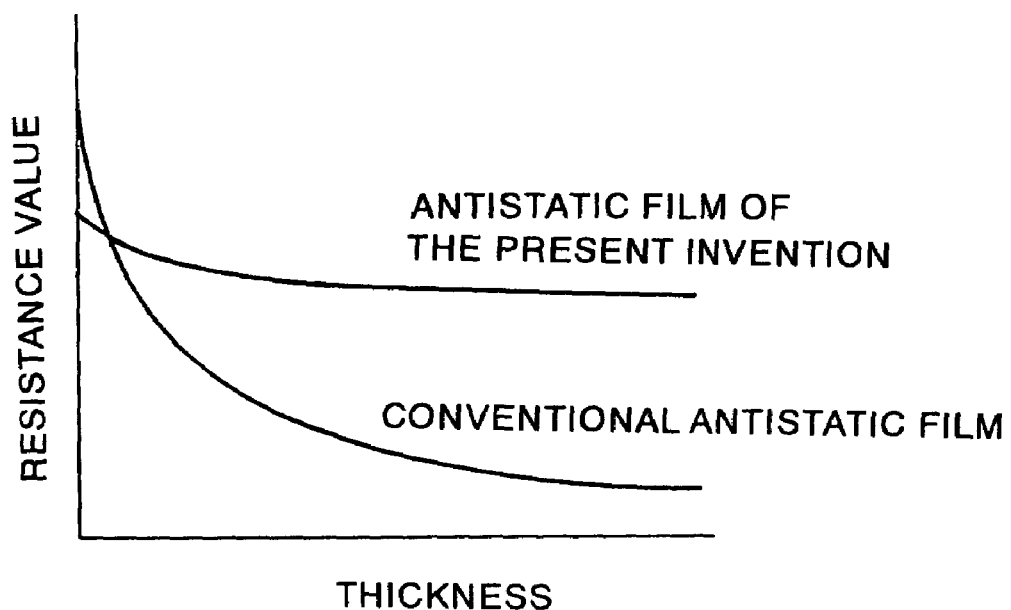
FIG. 1 is a graph schematically showing a relationship between a thickness and a resistance value (surface resistivity) of the antistatic film of the present invention and a conventional antistatic film.
Figure 2:
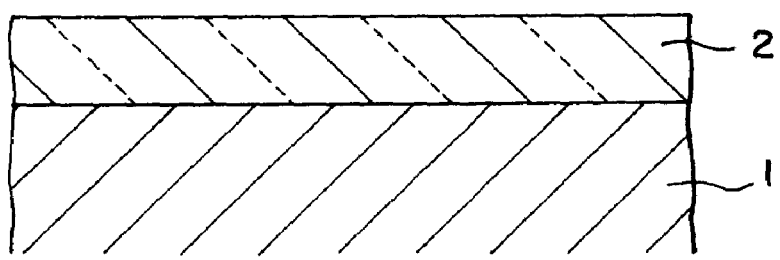
FIG. 2 is a sectional view showing a schematic structure of the antistatic film of the present invention.

FIG. 2 is a sectional view showing a schematic structure of the antistatic film according to the present invention. In the drawing, reference numeral 1 denotes an insulating substrate being held in a vacuum atmosphere, and an antistatic film 2 comprised of high-resistance fine particles having a specific resistivity of $10^6$ to $10^9 \Omega \cdot cm$ is formed on its surface.

The antistatic film 2 is formed by adding high-resistance fine particles having a specific resistivity of $10^6$ to $10^9$ $\Omega \cdot cm$ to and mixing with a solvent to disperse in it so to prepare a dispersion, applying the dispersion onto the insulating substrate 1, drying and baking it at a temperature in a range of 400° C. to 500° C. As the solvent, organic solvents including alcohols such as methanol, ethanol and isopropyl alcohol, ethers such as ethylene glycol monomethyl ether and ethylene glycol monoethyl ether, glycols such as ethylene glycol, propylene glycol and hexylene glycol, and heterocycles such as tetrahydrofurfuryl alcohol and N-methylpyrrolidone can be used. A well-known dispersant can be added to such solvents.

As the high-resistance fine particle having a specific resistivity of $10^6$ to $10^9$ $\Omega \cdot cm$, antimony pentoxide ($Sb_2O_5$) having a pyrochlore crystal structure can be used. Additionally, a fine particle having a structure in which a covering layer of at least one insulating substance selected from $SiO_2$, $TiO_2$, $Al_2O_3$ and $ZrO_2$ is formed on a core layer of at least one semiconducting substance selected from $SnO_2$, $In_2O_3$, $Sb_2O_5$ and $ZnO_2$ can also be used.

Such high-resistance fine particle is desired to have a particle diameter of 5 to 100 nm. When the particle diameter is less than 5 nm, workability of applying the dispersion is poor, so that it is hard to obtain an antistatic film having a desired thickness to be described below. On the contrary, when the particle diameter exceeds 100 nm, it is not desirable because film-forming properties become defective, resulting in deterioration of uniformity of the antistatic film.

As a method of applying the dispersion, a simple and easy method such as spray coating or brushing can be used other than the dip coating method or the spin coating method.

Besides, it is desired that the antistatic film formed as described above have a thickness of 50 to 1000 nm in order to control the surface resistivity of the antistatic film to the most preferable range ($10^{10}$ to $10^{12}$ $\Omega/cm^2$). When the antistatic film has a thickness of less than 50 nm, the surface resistivity becomes too high to obtain a desired antistatic property. On the contrary, when the thickness exceeds 1000 nm, the surface resistivity becomes too low to obtain a desired antistatic property, and the film is easily cracked.

In addition, it is desired that the antistatic film 2 has a covering ratio of 20% or more of the entire surface area of the insulating substrate 1 which is held in a vacuum atmosphere. When the covering ratio of the antistatic film 2 is less than 20%, a desired antistatic property cannot be obtained.

The antistatic film of the present invention has a reduced dependency of the resistance value (surface resistivity) on the thickness of the film, so that it is not necessary to control the thickness of the film precisely in order to obtain a desired resistance value. Therefore, it can be formed by a simple and easy method such as spray coating or brushing. This antistatic film has a desired stable resistance value and can be used satisfactorily even in a vacuum atmosphere such as the interior of a vacuum envelope.

Next, as embodiments of the image display device having such an antistatic film, a color cathode-ray tube and a field emission display (FED) will be explained with reference to the drawings.

Figure 3:
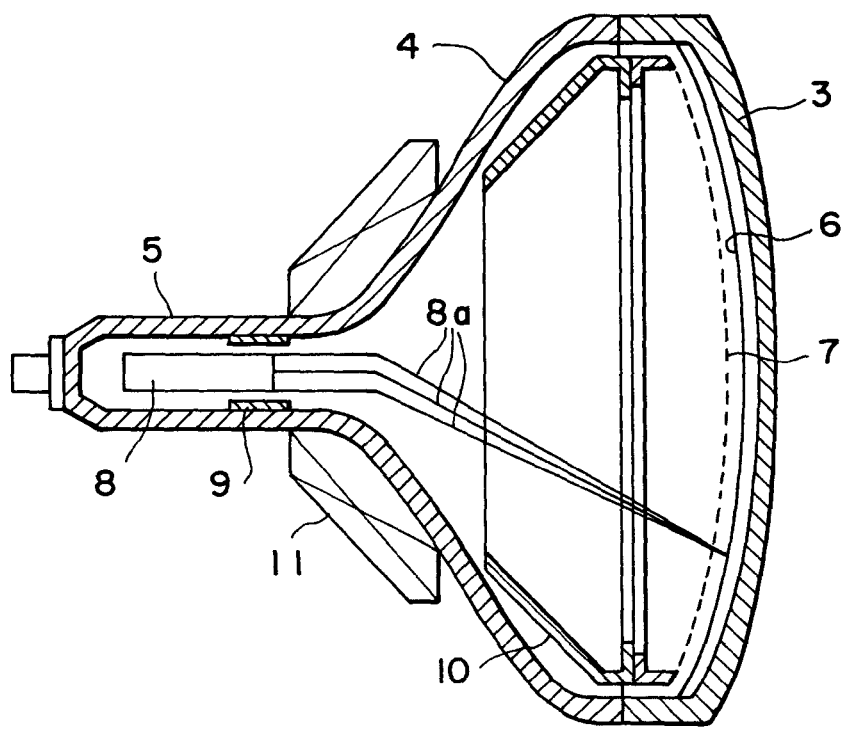
FIG. 3 is a sectional view showing a schematic structure of a color cathode-ray tube according to a first embodiment of the image display device of the present invention.

The color cathode-ray tube according to the first embodiment has an envelop including a glass panel 3, a glass funnel 4 and a glass neck 5 as shown in FIG. 3. A phosphor screen 6 is formed on the inside surface of the panel 3, and a shadow mask 7 is disposed inside of and to face the phosphor screen 6. In order to improve brightness, contrast, luminescence chromaticity and the like, a color filter (not shown) having a color corresponding to a luminescence color of the phosphor substance can be disposed between the phosphor screen 6 and the panel 3.

Meanwhile, an electron gun 8 which emits the beam of electrons 8a is disposed within the glass neck 5. And, the antistatic film 9 is formed on the inside wall of the neck 5 to cover an area of 20% or more of the entire inside wall, and its end is connected to a conductive layer (not shown). An inner shield 10 is disposed within the funnel 4 in order to shield the electron beam 8a, which is emitted from the electron gun 8, from an external magnetic field, and a deflecting device 11, which deflects the electron beam 8a by a magnetic field produced, is disposed outside of the funnel 4.

In the color cathode-ray tube, the antistatic film 9, which is comprised of high-resistance fine particles having a specific resistivity of $10^6$ to $10^9$ Ω·cm and has desired stable properties (surface resistivity), is formed on the inside wall of the neck 5, so that the display characteristics are not deteriorated by a change of the track of electrons emitted in the application of high voltage, a spark in the tube or a leakage current.

Figure 4:
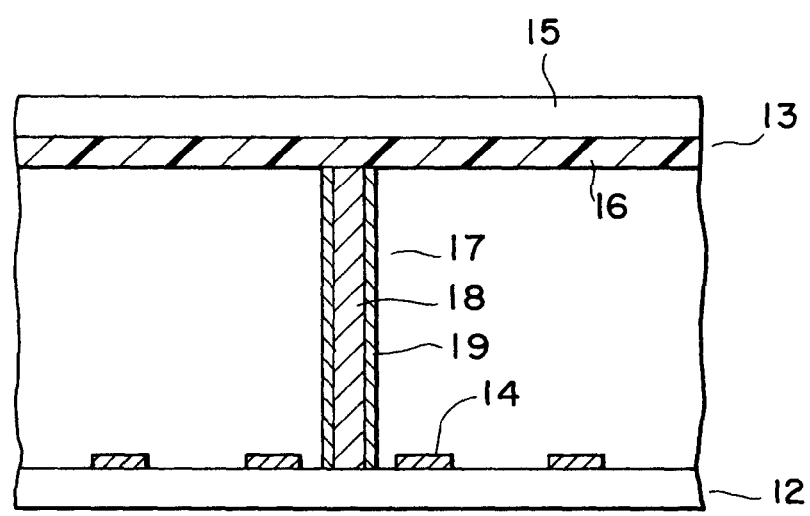
FIG. 4 is a sectional view showing a schematic structure of an FED according to a second embodiment of the image display device of the present invention.

In the FED according to the second embodiment of the image display device of the present invention, an electron emission-side substrate 12 and a light emission-side substrate 13 are disposed in parallel to face each other with a prescribed space between them as shown in FIG. 4, and the space is kept to have a high vacuum. The electron emission-side substrate 12 has a plurality of cold-cathode type electron emission elements 14 formed on a substrate of silicon or the like. And, the light emission-side substrate 13 has a glass panel 15, a phosphor screen 16 which is formed on the side of the glass panel 15 so to face the electron emission element 14, and a color filter (not shown), which corresponds to a luminescence color of the phosphor substance, disposed between the phosphor screen 16 and the glass panel 15.

In order to support a load which is applied to the silicon substrate by a weight of the glass panel 15 and atmospheric pressure as well, a spacer 17 is disposed between the electron emission-side substrate 12 and the light emission-side substrate 13. The spacer 17 has an insulating member 18 in the shape of a flat plate (with an I in cross section), a cross in cross section, an L in cross section, or the like. And, the antistatic film 19 is formed on its surface to cover an area of 20% or more of the entire area. An end of the antistatic film 19 is connected to a conductive layer (not shown).

The FED of the second embodiment has an antistatic film, which is comprised of high-resistance fine particles having a specific resistivity of $10^6$ to $10^9$ Ω·cm and has a desired stable antistatic property, formed on the surface of the insulating substrate 18 of the spacer 17, so that the display characteristics are not deteriorated by a change of the track of electrons emitted in the application of high voltage, a spark in the tube or a leakage current.

Then, the present invention will be further described with reference to specific examples. In the examples, "%" used indicates "wt %".

EXAMPLE 1

First, a dispersion for preventing electrification A (hereinafter referred to as the dispersion A) having the following compositions was prepared.

| | |
|---|---|
| Antimony pentoxide (pyrochlore crystal form) (particle diameter of 20 nm) | 1.0% |
| Ethanol | 99.0% |

The dispersion A was applied by brushing to the inside wall of the neck (outside diameter of 22.5 mm) of a 15-inch color cathode-ray tube to cover a length of about 15 mm in a direction of the tube axis. Then, it is baked at a temperature of about 450° C. to form an antistatic film having a thickness of 300 nm.

As Comparative Example 1, a dispersion for preventing electrification B (hereinafter referred to as the dispersion B) having the following compositions was prepared. The dispersion B was used to form an antistatic film (with a thickness of 100 nm) on the inside wall of the neck of a color cathode-ray tube in the same way as in Example 1.

| | |
|---|---|
| ATO (particle diameter of 10 nm) | 1.0% |
| Ethanol | 99.0% |

EXAMPLE 2

Composite fine particle C (hereinafter referred to as the particle C) was prepared by forming a covering layer (a thickness of 1 nm) of $SiO_2$ on the surface of fine ATO particle having a particle diameter of 50 nm by a sol-gel method. The particles C were measured for its specific resistivity to find to be $10^8$ Ω·cm.

Then, these fine particles C were used to prepare a dispersion for preventing electrification D (hereinafter referred to as the dispersion D) having the following compositions. The dispersion D was used to form an antistatic film (with a thickness of 150 nm) on the inside wall of the neck of a color cathode-ray tube in the same way as in Example 1.

| | |
|---|---|
| Fine particles C | 1.0% |
| Ethanol | 99.0% |

Next, the color cathode-ray tubes having the antistatic films obtained in Examples 1, 2 and Comparative Example 1 were checked for a convergence drift characteristic (change), the presence or not of a spark in the tube, and the presence or not of deterioration in focus characteristic due to a leakage current, respectively. Evaluated results are shown in Table 1.

TABLE 1

| | Example 1 | Example 2 | Comparative Example 1 |
|---|---|---|---|
| Amount of convergence drift change | 0.03 mm | 0.04 mm | 0.5 mm |
| Spark in a tube | None | None | Partly yes |
| Deterioration of focus by a leakage current | None | None | Yes |

It is apparent from Table 1 that the color cathode-ray tubes having the antistatic films obtained by Examples 1 and 2 are remarkably better than the color cathode-ray tube obtained by Comparative Example 1 in terms of a convergence drift characteristic, the presence or not of a spark in the tube, and a focus deterioration characteristic by a leakage current, respectively.

EXAMPLE 3

The dispersion A prepared in Example 1 was applied by brushing to the entire surface of a spacer member of low alkali glass for the FED and baked at a temperature of about 450° C. to form an antistatic film having a thickness of 500 nm.

Then, the FED having this spacer was fabricated by a known method. Specifically, a rear plate having a plurality of field emission type electron sources and a face plate having a phosphor layer arranged and formed in a prescribed pattern were disposed to face each other with the spacer having the antistatic film intervened between them, and side plates or the like were adhered to the circumferential edge for sealing to produce the FED.

In the same way as in Example 3, the dispersion B was used to form an antistatic film on the surface of a spacer member and FED was fabricated by using the spacer, as Comparative Example 2.

EXAMPLE 4

The dispersion D prepared in Example 2 was used to form an antistatic film on the surface of a spacer member and an FED having the spacer was fabricated in the same way as in Example 3.

Next, the FEDs obtained in Examples 3, 4 and Comparative Example 2 were checked for a deviation characteristic of a luminescent spot of the beam of electrons, the presence or not of a spark in the tube, and the presence or not of a leakage current, respectively. Evaluated results are shown in Table 2.

TABLE 2

|  | Example 3 | Example 4 | Comparative Example 2 |
| --- | --- | --- | --- |
| Displacement of luminescent spot of electron beam | None | None | Partly yes |
| Spark in a tube | None | None | Partly yes |
| Deterioration of focus by a leakage current | None | None | Yes |

It is apparent from Table 2 that the FEDs having the antistatic films obtained in Examples 3, 4 are better than the FED in Comparative Example 2 in terms of a displacement characteristic of a luminescent spot of the electron beam, a spark characteristic in the tube, and the presence or not of a leakage current.

INDUSTRIAL APPLICABILITY

As described above, by using the dispersion for preventing electrification according to the present invention, an antistatic film having a reduced dependency of a resistance value on a thickness of a film and on environments and having a stable performance can be formed by a simple and easy method such as spray coating or brushing. And, the antistatic film of the present invention can also be used in a vacuum atmosphere such as in a vacuum tube.

Besides, the image display device of the present invention has the antistatic film, which has a reduced dependency of a resistance value on the film thickness and on environmental conditions and a desired stable resistance value, formed on the surface of the insulating member disposed in the vacuum envelope, so that it exhibits stable and good display characteristics without causing the deterioration of display characteristics by the change of the track of electrons emitted by the application of voltage, a spark in the tube, or a leakage current. Therefore, its industrial value is extremely high.

What is claimed is:

1. An image display device, comprising a vacuum envelope which has a light emission-side substrate and an electron emission-side substrate disposed in parallel to face each other with a prescribed space between the light emission-side substrate and the electron emission-side substrate, the light emission-side substrate having a light transmissible panel and a phosphor layer formed on the inside surface of the light transmissible panel, the electron emission-side substrate having a plurality of electron emission elements, wherein an antistatic film comprising high-resistance fine particles having a specific resistivity of $10^6$ to $10^9$ Ω·cm is formed on at least a part of the inner surface of the vacuum envelope, and wherein said image display device is a field emission display (FED).

2. The image display device as set forth in claim 1, wherein the high-resistance fine particle of antimony pentoxide ($Sb_2O_5$) having a pyrochlore crystal structure.

3. The image display device as set forth in claim 1, wherein the high-resistance fine particle comprises a core layer which comprises of at least one semiconducting substance selected from $SnO_2$, $In_2O_3$, $Sb_2O_5$ and $ZnO_2$ and a covering layer which is formed on the core layer and comprises at least one insulating substance selected from $SiO_2$, $TiO_2$, $Al_2O_3$, and $ZrO_2$.

4. The image display device as set forth in claim 1, wherein the high-resistance fine particle has a particle diameter of 5 to 100 nm.

5. The image display device as set forth in claim 1, wherein the antistatic film has a thickness of 50 to 1000 nm.

6. An image display device, comprising a vacuum envelope which has a light emission-side substrate and an electron emission-side substrate disposed in parallel to face each other with a prescribed space between them, and a spacer having an insulating member which is disposed between the light emission-side substrate and the electron emission-side substrate, the light emission-side substrate having a light transmissible panel and a phosphor layer formed on the inside surface of the light transmissible panel, the electronic emission-side substrate having a plurality of electron emission elements, wherein an antistatic film comprising high-resistance fine particles having a specific resistivity of $10^6$ to $10^9$ Ω·cm is formed on the surface of the insulating member of the spacer, and wherein said image display device is a field emission display (FED).

7. The image display device as set forth in claim 6, wherein the high-resistance fine particle of antimony pentoxide ($Sb_2O_5$) having a pyrochlore crystal structure.

8. The image display device as set forth in claim 6, wherein the high-resistance fine particle comprises a core layer which comprises of at least one semiconducting substance selected from $SnO_2$, $In_2O_3$, $Sb_2O_5$ and $ZnO_2$ and a covering layer which is formed on the core layer and comprises at least one insulating substance selected from $SiO_2$, $TiO_2$, $Al_2O_3$, and $ZrO_2$.

9. The image display device as set forth in claim 6, wherein the high-resistance fine particle has a particle diameter of 5 to 100 nm.

10. The image display device as set forth in claim 6, wherein the antistatic film has a thickness of 50 to 1000 nm.

11. The image display device as set forth in claim 6, wherein the antistatic film is formed to cover 20% or more of the surface area of the insulating member of the spacer.

* * * * *